US009971513B2

(12) United States Patent
Bilas et al.

(10) Patent No.: US 9,971,513 B2
(45) Date of Patent: May 15, 2018

(54) SYSTEM AND METHOD FOR IMPLEMENTING SSD-BASED I/O CACHES

(75) Inventors: Angelos Bilas, Herkalion (GR); Michail D. Flouris, Heraklion (GR); Yannis Klonatos, Athens (GR); Thanos Makatos, Larissa (GR); Manolis Marazakis, Heraklion (GR)

(73) Assignee: INTEL CORPORATION, Santa Clara, CA (US)

( * ) Notice: Subject to any disclaimer, the term of this patent is extended or adjusted under 35 U.S.C. 154(b) by 321 days.

(21) Appl. No.: 13/976,271

(22) PCT Filed: Jul. 24, 2012

(86) PCT No.: PCT/CA2012/050497
§ 371 (c)(1),
(2), (4) Date: Mar. 26, 2015

(87) PCT Pub. No.: WO2014/015409
PCT Pub. Date: Jan. 30, 2014

(65) Prior Publication Data
US 2015/0193144 A1    Jul. 9, 2015

(51) Int. Cl.
*G06F 3/06* (2006.01)
*G06F 12/08* (2016.01)
(Continued)

(52) U.S. Cl.
CPC .............. *G06F 3/061* (2013.01); *G06F 3/064* (2013.01); *G06F 3/0655* (2013.01);
(Continued)

(58) Field of Classification Search
CPC ........ G06F 3/061; G06F 3/064; G06F 3/0655; G06F 3/0679; G06F 12/0871;
(Continued)

(56) References Cited

U.S. PATENT DOCUMENTS

| 9,268,702 B2 * | 2/2016 | Bilas ........................ G06F 11/00 |
| 2004/0117441 A1 * | 6/2004 | Liu ...................... G06F 12/0888 709/203 |

(Continued)

OTHER PUBLICATIONS

Thanos Makatos, Yannis Klonatos, Manolis Marazakis, Michail D. Flouris, and Angelos Bilas. 2010. Using transparent compression to improve SSD-based I/O caches. In Proceedings of the 5th European conference on Computer systems (EuroSys '10). ACM, New York, NY, USA, 1-14. DOI=http://dx.doi.org/10.1145/1755913. 1755915.*

(Continued)

*Primary Examiner* — Daniel Tsui
*Assistant Examiner* — William E Baughman
(74) *Attorney, Agent, or Firm* — Womble Bond Dickinson (US) LLP

(57) ABSTRACT

A method for caching a data block stored on a first storage device and onto a second storage device including determining whether a data block being requested contains a first type of data, upon a condition in which the data block contains the first type of data, writing the data block to the second storage device and upon a condition in which the data block does not contain the first type of data, determining whether a correspondingly mapped block on the second storage device contains the first type of data, and only writing the data block to the second storage device upon a condition in which the correspondingly mapped block does not contain the first type of data.

21 Claims, 9 Drawing Sheets

(c) ADMISSION CONTROL PATH

(51) Int. Cl.
*G06F 12/12* (2016.01)
*G06F 12/0871* (2016.01)
*G06F 12/0888* (2016.01)
*G06F 12/123* (2016.01)
*G06F 12/126* (2016.01)
*G06F 12/0864* (2016.01)
*G06F 12/0868* (2016.01)

(52) U.S. Cl.
CPC ........ *G06F 3/0679* (2013.01); *G06F 12/0871* (2013.01); *G06F 12/0888* (2013.01); *G06F 12/123* (2013.01); *G06F 12/126* (2013.01); G06F 12/0864 (2013.01); G06F 12/0868 (2013.01); G06F 2206/1014 (2013.01); G06F 2212/1016 (2013.01); G06F 2212/1048 (2013.01); G06F 2212/222 (2013.01); G06F 2212/281 (2013.01); G06F 2212/303 (2013.01); G06F 2212/466 (2013.01)

(58) Field of Classification Search
CPC .. G06F 12/0888; G06F 12/123; G06F 12/126; G06F 12/0864; G06F 12/0868; G06F 2206/1014; G06F 2212/1016; G06F 2212/1048; G06F 2212/222; G06F 2212/281; G06F 2212/303; G06F 2212/466
See application file for complete search history.

(56) References Cited

U.S. PATENT DOCUMENTS

| | | | |
|---|---|---|---|
| 2008/0104329 A1* | 5/2008 | Gaither | G06F 12/0888 711/138 |
| 2009/0327607 A1 | 12/2009 | Tetrick et al. | |
| 2011/0119228 A1 | 5/2011 | Menze et al. | |
| 2012/0290786 A1* | 11/2012 | Mesnier | G06F 12/0866 711/113 |

OTHER PUBLICATIONS

Hyo J. Lee et al., "Augmenting RAID with an SSD for Energy Relief", Nov. 17, 2008, pp. 1-5, XP061008980.
Supplementary EP Search Report, EP12881686, 9 pages, dated Feb. 23, 2016.
Xiangyong Ouyang et al., "Enhancing Checkpoint Performance with Staging IO and SSD", 2010 IEEE, 978-0-7695-4025-2, pp. 13-20.
Klonatos et al., "Azor: Using Two-level Block Selection to Improve SSD-based I/O caches", 2011 Sixth IEEE International Conference on Networking, Architecture, and Storage, 2011, 10 pages.
Makatos et al., "Using Transparent Compression to Improve SSD-based I/O Caches", 2010, 14 pages.
PCT Search Report and Written Opinion, PCT/CA2012/050497, dated Feb. 13, 2013 9 pages.

* cited by examiner (a) SYSTEM ARCHITECTURE

SPECsfs2008 RESULTS: (a) IMPACT OF FILESYSTEM METADATA DRAM MISSES ON PERFORMANCE. (b) + (c) IMPACT OF THE 2LBS SCHEME WITH 4 GB DRAM. THE WRITE POLICY USED IS THE WRITE-HDD-UPD AND AZOR STARTS WITH A COLD CACHE

IMPACT OF DIFFERENT ASSOCIATIVITIES AND CACHE SIZES ON TPC-H though the advantages brought forth by their cost and performance characteristics over those of typical hard-disk drives (HDDs) are brought to fruition. Table 1, shows the difference in performance metrics of HDDs versus SSDs:

SYSTEM AND METHOD FOR IMPLEMENTING SSD-BASED I/O CACHES

CROSS-REFERENCE TO RELATED APPLICATION

This patent application is a U.S. National Phase Application under 35 U.S.C § 371 of International Application No. PCT/CA2012/050497, filed Jul. 24,2012, entitled SYSTEM AND METHOD FOR IMPLEMENTING SSD-BASED I/O CACHES.

FIELD OF THE INVENTION

The invention relates to the field methods and systems for improving the input/output performance of data storage systems, and more particularly to implementations of solid-state drive based caches for improving the input/output performance of data storage systems.

BACKGROUND OF THE INVENTION

The use of current generation NAND-Flash solid state drives (SSDs) for accelerating demanding server workloads, such as file and mail servers, business and scientific data analysis, as well as for online transaction processing databases is becoming more common as the advantages brought forth by their cost and performance characteristics over those of typical hard-disk drives (HDDs) are brought to fruition. Table 1, shows the difference in performance metrics of HDDs versus SSDs:

TABLE I

HDD AND SSD PERFORMANCE METRICS.

|  | SSD | HDD |
| --- | --- | --- |
| Price/capacity ($/GB) | $3 | $ 0.3 |
| Response time (ms) | 0.17 | 12.6 |
| Throughput (R/W) (MB/s) | 277/202 | 100/90 |
| IOPS (R/W) | 30,000/3,500 | 150/150 |

SSDs have the potential to mitigate input/output (I/O) penalties by offering superior performance to HDDs, albeit at a higher cost per gigabyte (GB). In addition, SSDs bear complexity caveats, related to their internal organization and operational properties. Accordingly, mixed-device system architectures are currently preferred in data storage systems. In one example, a mixed-device system includes SSDs as a caching layer on top of HDDs, where the cost of the SSDs is expected to be amortized over increased I/O performance, both in terms of throughput and access rate.

Recently, prior art implementations of SSDs as a caching layer on top of HDDs have focused on how to improve the I/O performance using SSD caches, including, for example the following publications.

T. Kgil and T. Mudge, "*FlashCache: a NAND flash memory file cache for low power web servers*," in CASES '06. ACM, pp. 103-112 discloses the use of flash memory as a secondary file cache for web servers.

S.-W. Lee, B. Moon, C. Park, J.-M. Kim, and S.-W. Kim, "*A case for flash memory ssd in enterprise database applications*," in SIGMOD '08. ACM, pp. 1075-1086 discloses an analysis of the impact of using SSDs in transaction processing.

X. Ouyang, S. Marcarelli, and D. K. Panda, "*Enhancing Checkpoint Performance with Staging IO and SSD*," in IEEE SNAPI '10, pp. 13-20 discloses how SSDs may be used in efficient checkpointing.

H. J. Lee, K. H. Lee, and S. H. Noh, "*Augmenting RAID with an SSD for energy relief*," in HotPower '08. USENIX-Association, pp. 12-12 discloses how SSDs can be used as a large cache on top of a RAID arrangement to conserve energy.

One of the problems with these prior art approaches is that they are application-specific and require application knowledge, intervention and tuning. In addition, the I/O bottlenecks resulting from the interface and relationship between SSDs and HDDs in such mixed-device systems are problematic when attempting to implement a general solution. This has driven the application-specific solutions currently known in the prior art. Accordingly, there is a need in the prior art for improvements to cache systems that address one or more of the above-identified problems with the prior art.

SUMMARY OF THE INVENTION

It is an object of the invention to address one or more of the above-identified problems with the prior art with respect to caching data stored on HDDs onto SSDs, however, the invention may also be applied to other types of data stores, and preferably to other types of data stores where the comparative performance metrics of the data stores are relatively comparable to each other in an analogous manner as was described above in the comparison between HDDs and SSDs. In any event, some advantages of the invention may be applicable to all caching methods and systems.

According to one embodiment of the invention, there is provided a method for carrying out a cache write operation of a data block stored on a first storage device and cached onto a second storage device. The method includes the steps of (a) mapping blocks of the first storage device onto blocks of the second storage device; (b) intercepting a request for the data block stored on the first storage device; (c) determining whether the data block being requested contains filesystem metadata; (d) upon a condition in which the data block contains filesystem metadata, writing the data block to the second storage device; (e) upon a condition in which the data block does not contain filesystem metadata, determining whether a correspondingly mapped block on the second storage device contains filesystem metadata; (f) upon a condition in which the correspondingly mapped block contains filesystem metadata aborting the cache write operation; (g) upon a condition in which the correspondingly mapped block does not contain filesystem metadata, determining whether the correspondingly mapped block contains data that is more frequently accessed than data on the data block; (h) upon a condition in which the correspondingly mapped block contains data that is more frequently accessed than data on the data block, aborting the cache write operation; and, (i) upon a condition in which the correspondingly mapped block contains data that is less frequently accessed than data on the data block, writing the data on the data block to the correspondingly mapped block on the second storage device.

According to one aspect of the invention, the first storage device is a hard disk drive, and in another aspect, the second storage device is a solid state drive.

According to another aspect of this embodiment, the intercepting step is carried out in an input/output path between the first storage device and a filesystem accessing the first storage device. Preferably, the intercepting step is carried by an admission control module implemented as a virtual block layer between the filesystem and the first storage device.

According to another embodiment of the invention, there is provided a method for caching a data block stored on a first storage device and onto a second storage device; the method including the steps of (a) mapping blocks of the first storage device onto blocks of the second storage device; (b) intercepting a request for the data block stored on the first storage device; (c) determining whether the data block being requested contains a first type of data; (d) upon a condition in which the data block contains the first type of data, writing the data block to the second storage device; (e) upon a condition in which the data block does not contain the first type of data, determining whether a correspondingly mapped block on the second storage device contains the first type of data; (f) upon a condition in which the correspondingly mapped block contains the first type of data aborting the cache write operation; and, (g) upon a condition in which the correspondingly mapped block does not contain the first type of data, writing the data on the data block to the correspondingly mapped block on the second storage device. For greater clarity, the steps identified in the method are of this embodiment are not limited to being in the order specified. For example, the mapping step may be repeated at any point during the method to optimize performance or reallocate data caching locations.

According to an aspect of this second embodiment, the method further includes, prior to writing the data, the steps of (h) determining whether the correspondingly mapped block contains a second type of data; (i) upon a condition in which the correspondingly mapped block contains the second type of data, aborting the cache write operation; (j) upon a condition in which the correspondingly mapped block does not contain the second type of data executing the writing the data on the data block to the correspondingly mapped block on the second storage device.

According to another aspect of this second embodiment, the first type of data is filesystem metadata.

According to another aspect of this second embodiment, the second type of data is data that is more frequently accessed than data on the data block.

According to another aspect of this second embodiment, the first storage device is a hard disk drive.

According to another aspect of this second embodiment, the second storage device is a solid state drive.

According to another aspect of this second embodiment, the intercepting step is carried out in an input/output path between the first storage device and a filesystem accessing the first storage device.

According to another aspect of this second embodiment, the intercepting step is carried by an admission control module implemented as a virtual block layer between the filesystem and the first storage device.

According to a third embodiment of the invention, there is provided a non-transitory computer readable medium having computer readable instructions thereon to carry out the method as herein described.

According to a fourth embodiment of the invention, there is provided a computer system including a filesystem in communication with a first storage device via an input/output path; an admission control module in the input/output path, and a second storage device in communication with the admission control module. The admission control module includes instructions for (a) mapping blocks of the first storage device onto blocks of the second storage device; (b) intercepting a request for a data block stored on the first storage device; (c) determining whether the data block being requested contains a first type of data; (d) upon a condition in which the data block contains the first type of data, writing the data block to the second storage device; (e) upon a condition in which the data block does not contain the first type of data, determining whether a correspondingly mapped block on the second storage device contains the first type of data; (f) upon a condition in which the correspondingly mapped block contains the first type of data aborting the cache write operation; and, (g) upon a condition in which the correspondingly mapped block does not contain the first type of data, writing the data on the data block to the correspondingly mapped block on the second storage device.

According to an aspect of this fourth embodiment, the admission control module further includes instructions for, prior to the writing the data step of (h) determining whether the correspondingly mapped block contains a second type of data; (i) upon a condition in which the correspondingly mapped block contains the second type of data, aborting the cache write operation; and, (j) upon a condition in which the correspondingly mapped block does not contain the second type of data executing the writing the data on the data block to the correspondingly mapped block on the second storage device.

According to another aspect of the fourth embodiment, the first type of data is filesystem metadata.

According to another aspect of the fourth embodiment, the second type of data is data that is more frequently accessed than data on the data block.

According to another aspect of the fourth embodiment, the first storage device is a hard disk drive.

According to another aspect of the fourth embodiment, the second storage device is a solid state drive.

DETAILED DESCRIPTION

The invention provides for a system and method by which second types of storage devices, for example SSDs, can be used as caches in the I/O path of, preferably, mixed-device arrangements including at least one SSD and at least one first type of storage device, such as HDDs. The embodiments as described below discuss the implementation of SSDs and HDDs in particular, as these are the preferred implementations of the invention, however, the invention is not to be considered as limited to same. In its implementation as will be described hereinbelow, the invention transparently and dynamically places data blocks in the SSD cache as such data blocks flow in the I/O path between the main memory of a computer system and the HDDs associated therewith. For the purposes of this disclosure, it will be understood that references to an SSD and/or an HDD in the singular apply equally to references to same in the plural, and vice versa, in the sense that SSD and HDD storage mediums may be connected in serial or parallel to increase the storage capacity or device performance required. The invention is not to be considered as limited by either the singular or plural of HDD and SDD unless explicitly stated.

Figure 1:
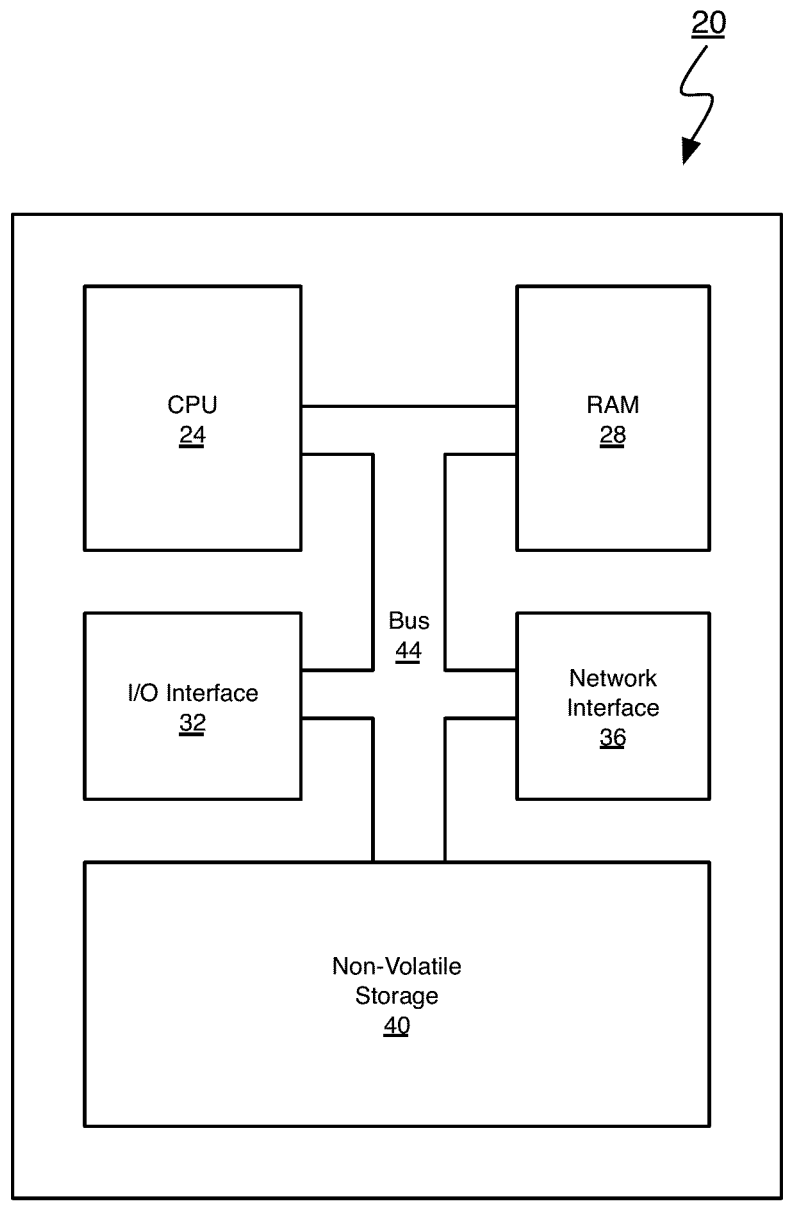
FIG. 1 shows a general computer system on which embodiments of the invention may be implemented.

The various embodiments of the invention may be implemented in a general computer system, or in a network of computer systems comprising two or more general computer systems. The invention generally operates within the context of a computer system, and serves to provide an improvement to the data storage capabilities available to general known computer systems, an exemplary one of which is shown in FIG. 1. As shown, the computer system 20 has a number of physical and logical components, including a central processing unit ("CPU") 24, random access memory ("RAM") 28, an input/output ("I/O") interface 32, a network interface 36, non-volatile storage 40, and a local bus 44 enabling the CPU 24 to communicate with the other components. The CPU 24 executes an operating system and a number of software systems. RAM 28 provides relatively-responsive volatile storage to the CPU 24. The I/O interface 32 allows for input to be received from one or more devices, such as a keyboard, a mouse, etc., and outputs information to output devices, such as a display and/or speakers. The network interface 36 permits communication with other systems. Non-volatile storage 40 stores the operating system and programs. During operation of the computer system 20, the operating system, the programs, and the data may be retrieved from the non-volatile storage 40 and placed in RAM 28 to facilitate execution. It is in the I/O connection between the non-volatile storage 40 and the RAM 28 that the invention is generally applied. The general computer system is shown for illustrative purposes only, and it will be understood that the invention may equally be applied to any computer system that has non-volatile storage in communication with a memory such as RAM, where there is a desire to cache certain data for carrying out faster read/write operations In implementing the invention to be transparent and dynamic such that application-specific adaptations are generally not required, a number of improvements are made over the prior that result from an identification of various problems that applicant has identified to be relevant in implementing the invention. First, based on their expected importance to system performance, the invention uses a two-level block selection scheme and dynamically differentiates between first and second types of HDD blocks before admitting them into the SSD Cache. More specifically, blocks that contain filesystem metadata are distinguished from blocks that contain application data. This is of importance in that various filesystem studies have shown that metadata handling is important to application performance. In addition, recent trends have shown that the impact of filesystem metadata accesses has become more pronounced as more complex applications and computer systems are used. Secondly, for all HDD blocks, the invention proposes maintaining a running estimate of the number of accesses over a sliding time window. This information is then used to prevent infrequently accessed blocks from evicting more frequently accessed ones. The implementations described below do not require application instrumentation or static a-priori workload analysis.

Next, a manner for representing the state of the SSD cache blocks in memory, such as DRAM is required. As will be described below, implementation of the invention results in metadata size growing proportionally to the SSD capacity available. Accordingly, compacting metadata to fit in DRAM is an important aspect. The metadata footprint in DRAM will increase with SSD device capacity, thereby making high-associativity organizations less cost effective. As is known, there are two aspects of cache design that determine the DRAM required for metadata: cache-associativity and cache line size. The invention proposes without being limited to two alternatives for cache-associativity: (a) a direct-mapped organization, which minimizes the required amount of DRAM for metadata, and (b) a fully set-associative organization that allows more informed block replacement decisions at the cost of consuming more DRAM space for its metadata. In addition, the performance impact from increasing the cache line size is analyzed, although larger cache lines decrease the required metadata space in DRAM, and doing so causes performance degradation in many cases.

Write-handling policies are also explored in terms of write-through vs. write-back which affects both system performance and reliability, write-invalidation vs. write-update in case of cache write hits, and write-allocation for cache write misses. It will be shown below that the choice of the write policy can make a significant difference in performance.

Maintaining a high degree of concurrent I/O accesses is important and considered in this invention. Any cache design needs to allow multiple pending I/O requests to be in progress at any time. The invention properly handles hit-under-miss and out-of-order completions by tracking the dependencies between in-flight I/O requests. The implementations described below minimize the overhead of accessing an additional state required for this purpose, as this additional state is required for all I/O operations that pass through the cache. The data structure used to carry this out is also compacted so that it fits within the limited DRAM space.

Although SSD caches bear similarities to traditional DRAM-based caches, there are significant differences as well, which result in the implementations of the invention as herein described. First, the impact of the block mapping policy, e.g. direct-mapped vs. fully-set-associative, is not as clear as in DRAM caches. In addition, SSD caches are significantly larger, resulting in a considerably larger metadata footprint. This is a factor unique to SSDs, considering their increasing size. Finally, unlike DRAM caches, SSD caches can be made persistent, thus avoiding warm-up overheads.

Figure 2:
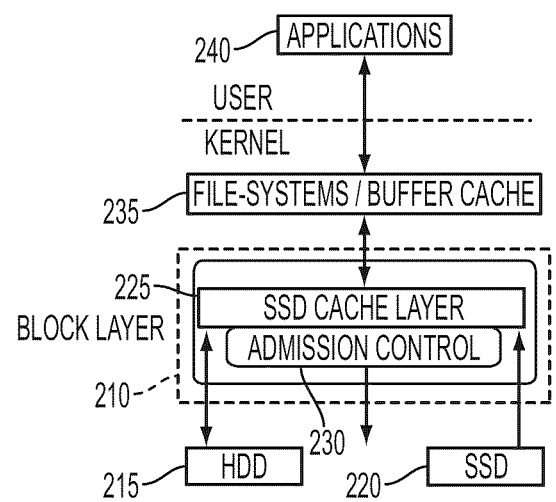
FIG. 2 shows one example of a system architecture for implementing an embodiment of the invention.

Referring now to FIG. 2, there is shown a system architecture in which the use of SSDs as I/O caches according to one embodiment of the invention is shown. The invention provides for a virtual block device abstraction layer 210, referred to as the virtual block layer 210, arranged to intercept requests in the I/O path and transparently caching HDD blocks 215 to dedicated SSD partitions 220 via the SSD cache layer 225. An admission control module 230 controls the caching of HDD blocks as described below. The address space of the SSDs is not visible to higher system layers, such as filesystems 235 and databases 240 at the application level. The virtual block layer 210 is preferably placed in the I/O path below the system buffer cache 235. Thus, all decisions on cache read/write operations are made dynamically as data is being retrieved from or written to the HDD, and in isolation from applications and/or filesystems.

Figure 3:
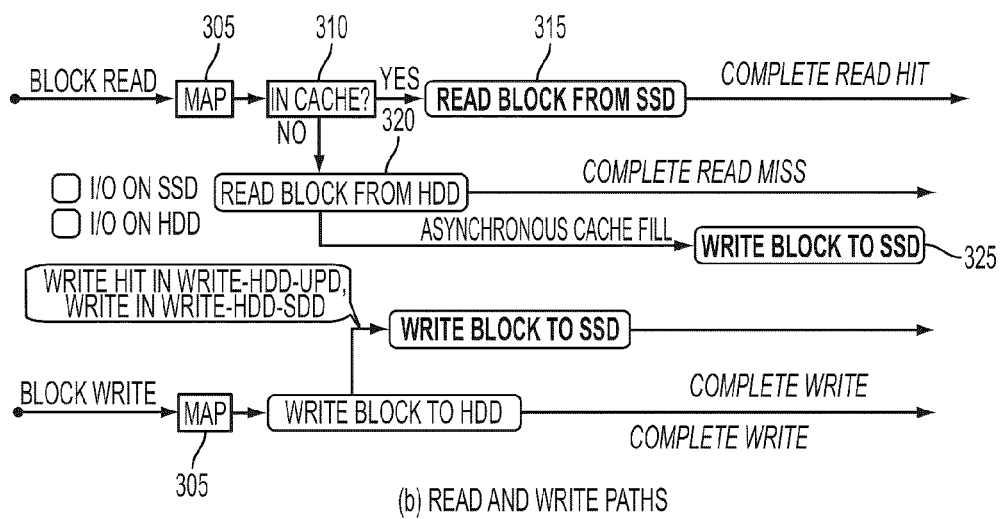
FIG. 3 is a flowchart showing the read/write process flow according to the invention.

Referring now to FIG. 3, there is shown a representative depiction of how I/O requests are handled according to the invention. Each HDD block is preferably mapped 305 to an SSD cache block, according to cache associativity for example. The mapping step may be repeated during execution of the method, and may further account for the type of data in a block being intercepted as well the blocks stored in the SSD. For reads, the invention checks if the cached block is valid at 310 and if so, forwards the request to the SSD (read hit) at 315. Otherwise, data is fetched from the HDD (read miss) at 320 and an asynchronous SSD write I/O (cache fill) is scheduled at 325.

For write operations, both hits and misses, the invention implements but is not limited to a write-through mechanism that has several advantages over prior art solutions that have been proposed in alternate implementations, including eliminating the need for synchronous metadata updates that have severe implications for latency-sensitive workloads, and in addition improving upon write-back cache designs that reduce system resilience to failures that would result in a loss of data if an SSD drive were to fail. The write-through arrangement provides write policies for forwarding the write request either to both the HDD and the SSD (write-hdd-sdd), or only to the HDD. In the second policy, during a write hit, the invention can either update (write-hdd-upd) or invalidate (write-hdd-inv) the corresponding cache block. The choice of write policy has implications for write-intensive workloads, as will be shown below. These operations and decisions described above may be implemented by the admission control module 230 shown in FIG. 2.

The admission control module 230 differentiates HDD blocks based on their expected importance to system performance. For this purpose, the invention implements a two-level block selection scheme that controls whether or not a specific cache block should be admitted to the SSD cache, according to its importance. Importance may be derived, in part, by differentiating between two classes of HDD blocks, namely filesystem metadata and filesystem data blocks. Other ways of deriving importance or differentiating between classes are also contemplated by the invention and can be implemented into the admission control module.

Filesystem metadata I/Os are preferably given priority over regular data I/Os for two reasons. First, metadata operations represent a large percentage of all the requests in a typical system. Hence, their impact on performance is disproportionate. Next, there has been a marked increase in filesystem capacities in recent years, with the average file size remaining relatively small. This results in more files and, thus, more metadata. The filesystem metadata footprint is further increased by the need for checksums at the filesystem level to achieve higher data protection, an approach already adopted by state-of-the-art filesystems. Therefore, it is increasingly difficult to rely solely on DRAM for metadata caching.

The Admission Control Module

The admission control module provides for differentiation between filesystem metadata and filesystem, for example, by modifying the XFS (in Linux kernel implementations) filesystem to tag metadata requests by setting a dedicated bit in the I/O request descriptor or by using an additional interceptor and tagging module below the filesystem as discussed in [0093]. Next, this information is used at the block level to categorize each HDD block. This modification does not affect filesystem performance and can easily be implemented in other filesystems as well. It is also noted that this modification only requires an additional class bit per SSD cache block.

Next, for the second level of the selection scheme, not all data blocks are treated equally. For example, in database environments indices improve query performance, by allowing fast access to specific records according to search criteria. Index requests produce frequent, small-size, and random HDD accesses, a pattern that stresses HDD performance. Moreover, given a set of queries to a database, the data tables are not usually access with the same intensity. In web-server environments, web pages usually exhibit temporal locality. Thus, it is expected that less benefit is derived from caching web pages that have recently been accessed only sporadically. Finally, the same principle applies to mail-servers in that more recent emails are more likely to be accessed again sooner than older ones. Based on these observations, data blocks on SSDs are cached by differentiating them according to their access frequency.

At the second level of selection, a running estimate of the accesses to each HDD block is kept in memory such that the one with the higher access count is more likely to remain in the SSD cache. This differentiation of HDD blocks overrides the selection of the "victim block" for eviction as determined by the least recently used (LRU) replacement policy in the fully-set-associative cache. Although workloads like TPC-C tend to have repetitive references, a good match for LRU, other workloads, such as TPC-H, rely on extensive one-time sequential scans which fill-up the cache with blocks that are not expected to be reused any time soon. Such blocks evict others that may be accessed again soon. If the LRU replacement is allowed to evict blocks indiscriminately, the cache will not be effective until it is re-populated with the more commonly used blocks. This is also the motivation behind adaptive replacement cache (ARC) policy, which keeps track of both frequently used and recently used pages and continuously adapts to the prevailing pattern in the reference stream. In the current invention, these per-block reference counters form an array in DRAM indexed by the HDD block number. The DRAM required for these counters increases in this invention along with the file-set size, not with the underlying HDD space. The evaluation presented below shows that this memory space is worth the trade-off, since differentiation improves performance overall.

Figure 4:
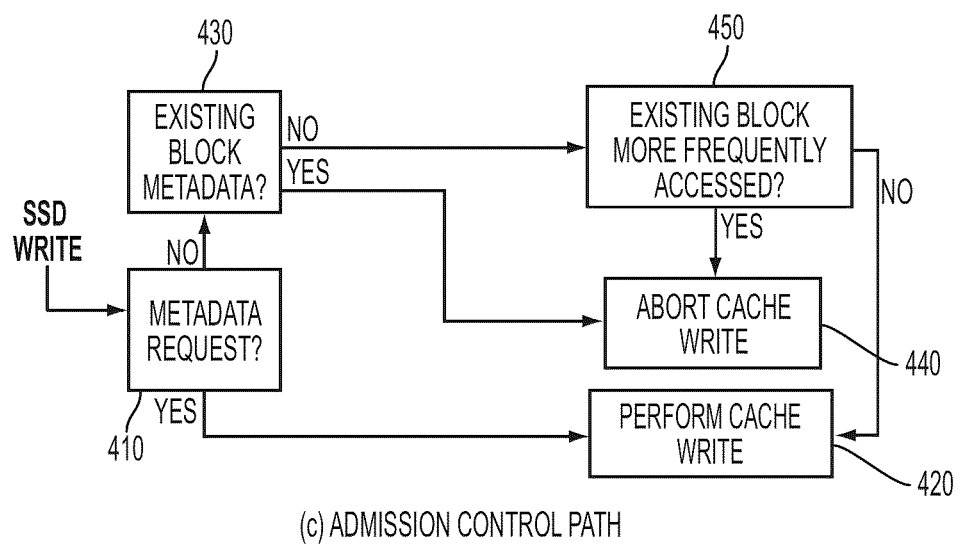
FIG. 4 is a flowchart showing details of the write process flow according to the invention.

Referring now to FIG. 4, there is shown the flowchart of part of the method implemented by the admission control module. Of note, the control path of read hits and writes to the HDD remains unaffected. On the other hand, cache fills and write hits to the SSD cache pass though the admission control module (as was graphically depicted in FIG. 2), which decides whether the write operation should actually be performed or not. The method implemented includes the steps of determining if an incoming request is a metadata request 410, and if so, it is immediately written to the cache at step 420 since filesystem metadata I/Os are prioritized over regular data I/Os. Otherwise, the incoming request contains filesystem data and the admission control module checks at step 430 whether the corresponding cache block contains filesystem metadata. The corresponding block is determined by the cache mapping and/or replacement policies or variations. For instance, in a direct-mapped cache the mapping policy will uniquely specify the corresponding block. In a fully set associative cache that uses an LRU replacement policy, the LRU policy will determine the corresponding block. Variations of mapping functions and replacement policies are possible and are not limited or excluded by the invention. If so, the cache fill is aborted at step 440. If not, both the incoming and the existing cache block contains regular data. In this case, step 450 is carried out to determine which block accessed more times, and the cache fill is performed or aborted such that the block that is accessed more times is written to or maintained in the cache.

Decisions that are typically taken in a cache for various operations are well known, but in particular, the invention focuses on policies related to when data read or written from the disk device is or is not written to the cache, and proposes, for example, using the type of the data that are both part of the request and the cache block to decide on whether to allocate such data to the cache or not. The decision on whether the cache will use a write-back or write-through is provided herein by way of example only. A specific two-level selection scheme proposed by this invention relies on taking into account for admission by the admission control module into the cache, information on whether the block requested and the corresponding block in the cache contains data or metadata and the frequency counter of each block. Additional classes of blocks defined by other metrics and criteria as well as steps for prioritizing these classes and weighting them are also contemplated by the invention. For example, distinctions can be made in the particular type of data, such as system versus data files, by way of a non-limiting example. Furthermore, selection can be made based on file parameters other than the frequency of access including, but not limited to, file size, date of last access, file extension, etc.

Cache Associativity

The choice of associativity is mainly a tradeoff between performance and metadata footprint. Traditionally, DRAM caches use a fully-set-associative policy since their small size requires reducing capacity conflicts. SSD caches, however, are significantly larger and, thus, they may use a simpler mapping policy, without significantly increasing capacity conflicts. In implementing the invention, two alternatives for cache associativity are considered. In particular, (a) a direct-mapped, and (b) a fully-set-associative cache design. On the one hand, a direct-mapped cache requires less metadata, hence a lower memory footprint, compared to a fully-set associative cache. This is very important, since metadata are required for representing the state of the SSD blocks in DRAM, and DRAM space is limited. Furthermore, the direct mapped cache design does not impose mapping overheads on the critical path and is fairly simple to implement.

All these advantages are particularly important when considering offloading caching to storage controllers. However, modern filesystems employ elaborate space allocation techniques for various purposes. For instance, XFS tends to spread out space allocation over the entire free space in order to enable utilization of all the disks backing the filesystem. Such techniques result in unnecessary conflict misses due to data placement. On the other hand, a fully-set-associative cache requires a significantly larger metadata footprint to allow a more elaborate block replacement decision through the LRU replacement policy. However, such a design fully resolves the data placement issue, thus reducing conflict misses. Metadata requirements for this design include, apart from the tag and the valid/dirty bits, pointers to the next and previous elements of the LRU list, as well as additional pointers for another data structure, explained below.

Designing a fully-set-associative cache appears to be deceptively simple. However, experience shows that implementing such a cache is far from trivial and it requires dealing with the following two challenges. First, it requires an efficient mechanism that quickly determines the state of a cache block, without increasing latency in the I/O path. This is necessary since it is impossible to check all cache blocks in parallel for a specific tag, as a hardware implementation would do. The invention uses but is not limited to arranging cache blocks into a hash table-like data structure. For each HDD block processed, a bucket is selected by hashing the HDD block number using a version of the Robert Jenkins' 32-bit integer hash function that has been modified to suite the goals of the invention. The list of cache blocks is then traversed, looking for a match. This arrangement minimizes the number of cache blocks that must be examined for each incoming I/O request. Second, there is a large variety of replacement algorithms typically used in CPU and DRAM caches, as well as in some SSD buffer management schemes, all of them prohibitively expensive for SSD caches in terms of metadata size. Moreover, some of these algorithms assume knowledge of the I/O patterns the workload exhibits, whereas the invention as implemented aims to be transparent to the application level. It has been experimentally found that simpler replacement algorithms, such as random replacement, result in unpredictable performance. According, applicant has opted for the LRU policy, since it provides a reasonable reference point for other more sophisticated policies, and the two-level selection scheme can be designed as a complement to the LRU replacement decision.

Cache Line Size

Metadata requirements for both cache associativities can be reduced by using larger cache lines. This is a result of reducing the need of per-block tag, as many blocks are now represented with the same tag. By doing so, metadata footprint can be reduced by up to 1.9 times and 6.9 times, for the direct-mapped and the fully-set-associative cache, respectively. In addition, larger cache lines can benefit workloads that exhibit good spatial locality while smaller cache lines benefit more random workloads. A less obvious implication is that larger cache lines also benefit the flash translation layers (FTL) of SSDs. A large number of small data requests can quickly overwhelm most FTLs, since finding a relatively empty page to write to is becoming increasingly difficult. Finally, using larger cache lines has latency implications, as discussed later.

I/O Concurrency

Modern storage systems exhibit a high degree of I/O concurrency, having multiple outstanding I/O requests. This allows overlapping I/O with computation, effectively hiding the I/O latency. To sustain a high degree of asynchrony, the invention provides for callback handlers instead of blocking, waiting for I/O completion. In addition, concurrent accesses are permitted on the same cache line by using a form of reader-writer locks, similar to the buffer-cache mechanism. Since using a lock for each cache line prohibitively increases metadata memory footprint, only pending I/O requests are tracked. Caching HDD blocks to SSDs has another implication for I/O response time: Read misses incur an additional write I/O to the SSD when performing a cache fill. Once the missing cache line is read from the HDD into DRAM, the buffers of the initial request are filled and the admission control module can perform the cache fill by either (a) re-using the initial application I/O buffers for the write I/O, or (b) by creating a new request and copying the filled buffers from the initial request. Although the first approach is simpler to implement, it increases the effective I/O latency because the issuer must wait for the SSD write to complete. On the other hand, the second approach completely removes the overhead of the additional cache fill I/O, as the initial request is completed after the buffer copy and then the cache fill write request is asynchronously issued to the SSD. However, this introduces a memory copy in the I/O path, and requires maintaining state for each pending cache write. Preferably, the second approach is adopted as the memory throughput in the architecture of the invention is an order of magnitude higher than the sustained I/O throughput. However, other SSD caching implementations, such as in storage controllers, may decide differently, based on their available hardware resources.

Handling write misses is complicated in the case of larger cache lines when only part of the cache line is modified: the missing part of the cache line must first be read from the HDD in memory, merged with the new part, and then written to the SSD. It has been found that this approach disproportionally increases the write miss latency without providing significant hit ratio benefits. Therefore, support is provided for partially valid cache lines by maintaining valid and dirty bits for each block inside the cache line. For write requests forwarded to both HDDs and SSDs, the issuer is notified of completion when the HDDs finish with the I/O. Although this increases latency, it may be unavoidable since write-through implementations of the invention start with a cold cache in case of failures and the up-to-date blocks must always be located on the HDDs, to protect against data corruption.

Performance Evaluation Methodology

The preferred embodiments of the invention herein described were evaluated on a server-type x86-based system, equipped with a Tyan S5397 motherboard, two quad-core Intel Xeon 5400 64-bit processors running at 2 GHz, 32 GB of DDR-II DRAM, twelve 500-GB Western Digital WD5001AALS-00L3B2 SATA-II disks connected on an Areca ARC-1680D-IX-12 SAS/SATA storage controller, and four 32-GB enterprise-grade Intel X25-E (SLC NAND Flash), connected on the motherboard's SATA-II controller. The OS installed is CentOS 5.5, with the 64-bit 2.6.18-194.32.1.e15 kernel version. The storage controller's cache is set to writethrough mode. Both HDDs and SSDs are arranged in RAID-0 configurations, the first using the Areca hardware RAID, and the latter using the MD Linux driver with a chunk-size of 64 KB. The XFS filesystem with a block-size of 4 KB, mounted using the inode64, nobarrier options was used. Moreover, the SSD device controller implements in firmware a significant portion of the functionality of these filesystems. The database server used is MySQL 5.0.77.

The evaluation is focused on I/O-bound operating conditions, where the I/O system has to sustain high request rates. In some cases, we limit the available DRAM memory, in order to put more pressure on the I/O subsystem. For our evaluation, we use three I/O-intensive benchmarks: TPC-H, SPECsfs2008, and Hammerora, the parameters of which are discussed next.

TPC-H: is a data-warehousing benchmark that issues business analytics queries to a database with sales information. We execute queries Q1 to Q12, Q14 to Q16, Q19, and Q22 back to back and in this order. We use a 28 GB database, of which 13 GB are data files, and vary the size of the SSD cache to hold 100% (28 GB), 50% (14 GB), and 25% (7 GB) of the database, respectively. TPC-H does a negligible amount of writes, mostly consisting of updates to file-access timestamps. Thus, the choice of the write policy is not important for TPC-H, considering we start execution of the queries with a cold cache. We set the DRAM size to 4 GB, and examine how the SSD cache size affects performance.

SPECsfs2008 emulates the operation of an NFSv3/CIFS file server; our experiments use the CIFS protocol. In SPECsfs2008, a set of increasing performance targets is set, each one expressed in CIFS operations-per-second. The file set size is proportional to the performance target (120 MB per operation/sec). SPECsfs2008 reports the number of CIFS operations-per-second actually achieved, as well as average response time per operation. For our experiments, we set the first performance target at 500 CIFS ops/sec, and then increase the load up to 15,000 CIFS ops/sec. The DRAM size is set to 32 GB. Contrary to TPC-H, SPECsfs2008 produces a significant amount of write requests, so we examine, along with associativity, the impact of the write policy on performance. We use two cache sizes, of 64 and 32 GB, respectively.

TPC-C is an OLTP benchmark, simulating order processing for a wholesale parts supplier and its customers. This workload issues a mix of several concurrent short transactions, both read-only and update-intensive. The performance number reported by this benchmark is New Order Transactions Per Minute (NOTPM). We use the Hammerora load generator on a 155-GB database that corresponds to a TPC-C configuration with 3,000 warehouses. We run experiments with 512 virtual users, each executing 1,000 transactions. As with TPC-H, we limit system memory to 4 GB.

Performance Results

In this section we first examine how the Two-Level Block Selection Mechanism (2LBS) improves the performance of the SSD cache as implemented by the invention. Then, we analyze how four design parameters: 1) cache associativity, 2) cache size 3) write policy, and 4) cache line size affect the performance of the system herein described.

Block Selection Scheme

For this case study we select cases that exhibit a fair amount of conflict misses, since that is when we expect our two-level block selection scheme to benefit performance. Thus, we do not explore trivial cases, such as having the whole workload fitting in the SSD cache, for which no additional performance benefit can be acquired. We analyze how each level of our proposed scheme separately improves performance, as well as the additional performance gains by combining them. We compare the performance of an SSD cache that uses the block selection scheme with: i) native HDDs runs, and ii) an LRU base cache. The base cache does not use neither levels of the 2LBS scheme and employs the write-hdd-upd write policy. For the two designs (2LBS and base), we analyze the performance of both the direct-mapped and LRU-based fully-set-associative caches.

1) TPC-H: Since this benchmark performs a negligible amount of writes. both the file-set size and the number of files do not grow during workload execution. Thus, applicant's system receives a minimal amount of filesystem metadata I/Os. Consequently, pinning filesystem metadata on the SSD cache provides no performance benefit for workloads like TPC-H.

Figure 5:
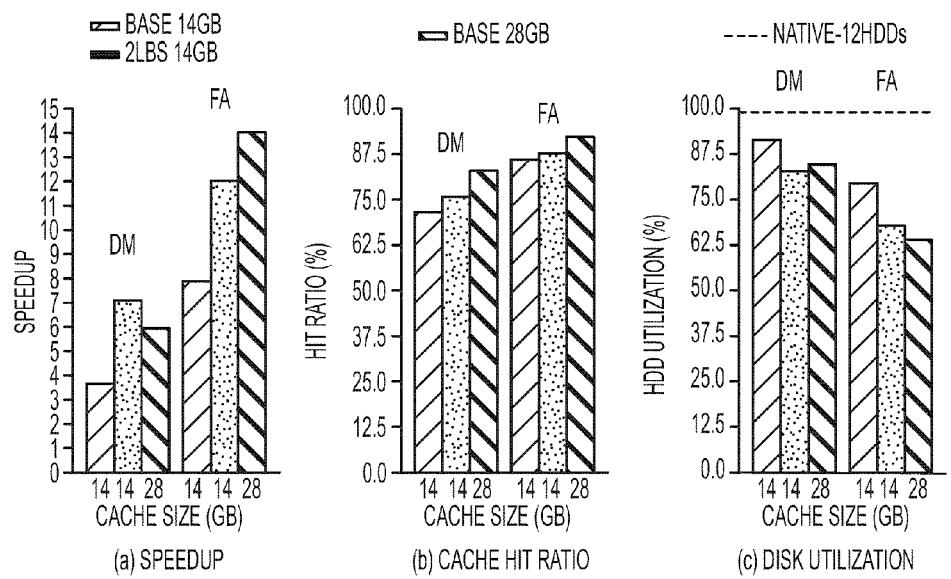
FIGS. 5(a)-(c) show the impact of a block selection scheme on TPC-H for both direct-mapped and fully-set-associative caches.

FIGS. 5(a)-(c) show the results of using the 2LBS scheme for TPC-H. In all these experiments, the system starts with a cold cache, using 4 GB of DRAM. Since TPC-H is very sensitive to DRAM, for the 2LBS scheme we allocate extra DRAM, as much as required. We use the medium size (14 GB) direct-mapped (DM) and fully-set-associative (FA) caches as a test case. As shown in FIG. 5(a) the use of the block selection mechanism improves the performance of the direct-mapped and the fully-set-associative caches by approximately 1.95 times and 1.53 times, respectively. Also noteworthy is the fact that the medium size (14 GB) direct-mapped 2LBS cache performs better than the large size (28 GB) base cache counterpart. This is because the medium-size 2LBS design caches more important data than the large size cache, for a lower hit ratio (FIG. 5(b)), and for 1.9% less disk utilization (FIG. 5(c)). However, the same behavior is not reproduced for the fully-set-associative cache, since this cache design employs the LRU replacement policy, which provides better performance for the larger cache.

Figure 6:
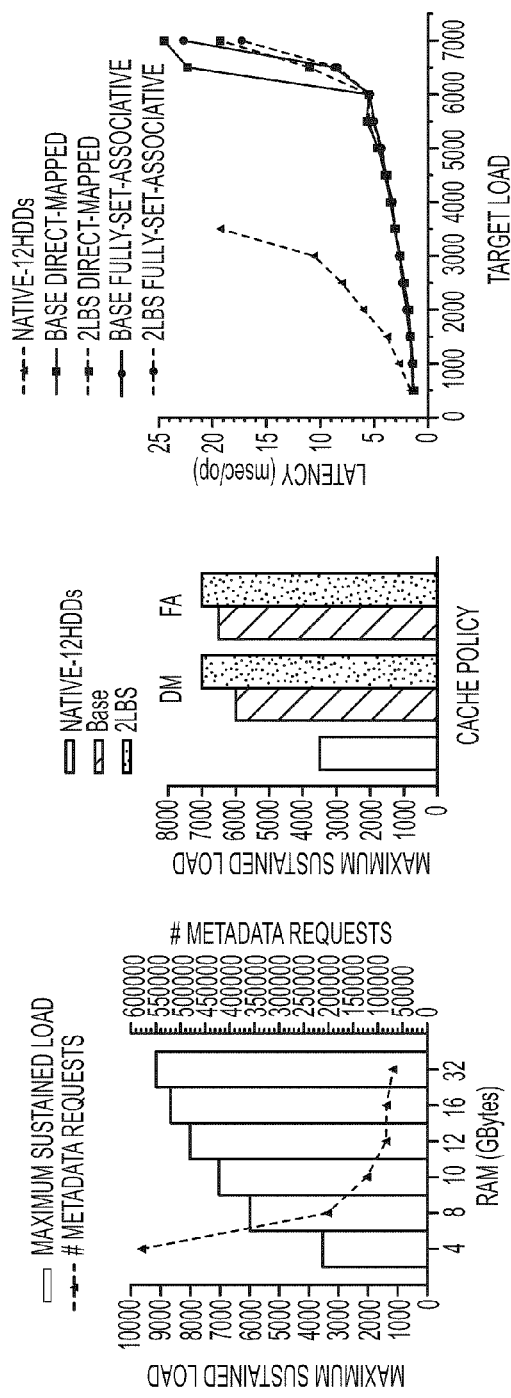
FIGS. 6(a)-(c) show the SPECsfs2008 results of the impact of filesystem metadata on performance.

2) SPECsfs2008: Contrary to TPC-H, SPECsfs2008 equally accesses filesystem data blocks and thus, using running estimates of blocks accesses cannot further improve performance. On the other hand, the file-set produced by SPECsfs2008 continuously increases during workload execution and thus, the metadata footprint continuously increases as well. Consequently, it is assumed that system performance is affected by the filesystem metadata DRAM hit ratio. To validate this assumption, we run SPECsfs2008 on the native 12 HDDs setup, while varying the available DRAM size. FIG. 6(a) shows that, as the DRAM size increases, the number of metadata I/Os that reach the admission control module significantly decreases, providing substantial performance gains. This is evident when moving from 4 GB to 8 GB of DRAM; a 186% reduction in metadata requests results in 71% better performance. Thus, we expect to gain significant performance improvements for SPECsfs2008 by pinning filesystem metadata on SSDs.

For our experiments, we choose the worst-case scenario with 4 GB DRAM, using the best write policy (write-hdd-upd), and starting with an 128 GB cold cache. Since SPECsfs2008 is less sensitive to DRAM for filesystem data caching, we do not allocate further memory for the 2LBS scheme. FIG. 6(b) shows that even the base version of the invention significantly improves performance, achieving an increase in speed of 1.71 times and 1.85 times for the direct-mapped and fully-set-associative caches, respectively. Furthermore, by pinning filesystem metadata on SSDs, performance further improves by 16% and 7% for the two associativities, respectively. These improvements are accompanied by a significant decrease in latency. FIG. 6(c) shows that the admission control module supports roughly 3,000 more operations per second for the same latency, compared to the native 12 HDDs run. In addition, there is a 21% and 26% decrease in latency for the direct-mapped and fully-set-associative cache designs, respectively, when comparing the base with the 2LBS version of the invention at the last sustainable target load (7000 ops/sec). This, however, is not a result of an increase in hit ratio (not shown), but only of pinning filesystem metadata on SSDs.

3) Hammerora: Finally, we examine how the two-level block selection arrangement performs when faced with a blackbox workload. For this purpose, we use Hammerora, 4 GB of DRAM, and a cold cache, large enough to hold half the TPC-C database (77.5 GB). Since Hammerora is an OLTP workload, we expect the admission control module to receive a significant amount of write requests, hence we choose our best write policy (write-hdd-upd) for these experiments. The results show that even the base version of the invention improves performance by 20% and 55%, for the direct-mapped and fully-set-associative cache designs, respectively. In addition, with the 2LBS arrangement, performance further improves by 31% and 34% for the two associativities, respectively. Not both levels of the 2LBS scheme equally benefit Hammerora. When the two levels are applied individually on the fully-set-associative cache, there is 9% and 24% performance improvement respectively, compared to the base version. As with SPECsfs2008, although there is no change in the hit ratio between the base and the 2LBS versions for both associativities, the performance benefits are a result of which HDD blocks are cached. For this workload, disk utilization is at least 97%, while cache utilization remains under 7% for all configurations. These results reveal that SSD caches according to the invention can greatly improve OLTP workloads, especially when a large percentage of the database fits in the cache.

System Design Parameters

Next, an analysis is provided as to how cache associativity, cache size, and the write policy affect the performance of the invention. Then, we present observations on using larger cache lines. These experiments are performed without the 2LBS scheme, so that the impact of these parameters becomes more evident.

Figure 7:
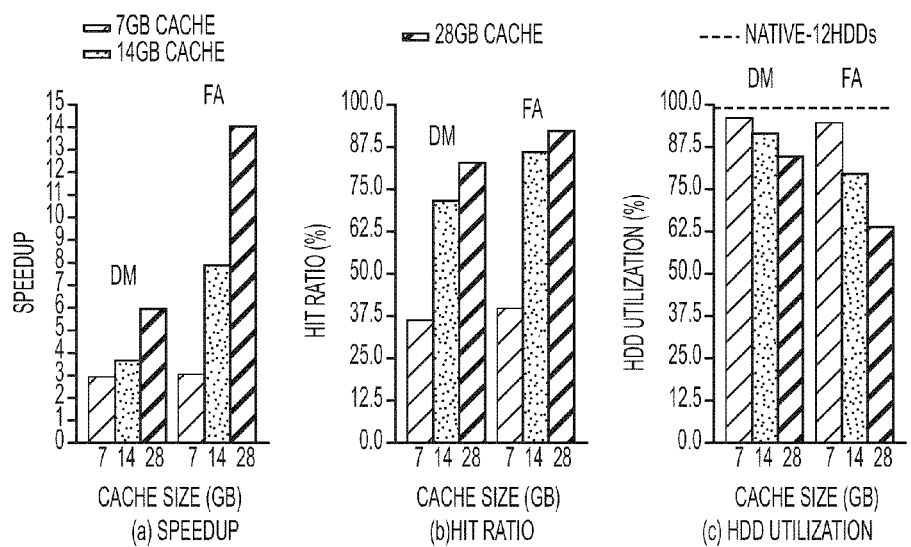
FIGS. 7(a)-(c) show the impact of different associativities and cache sizes on TPC-H performance.

1) TPC-H: FIGS. 7(a)-(c) show the performance gains of the invention, compared to the native HDDs. In all experiments, the system of the invention starts with a cold cache and uses 4 GB of DRAM. FIG. 7(a) shows that performance improves along with larger cache sizes, both for the direct-mapped and the fully-set-associative cache.

Cache associativity greatly affects performance as well; when the workload does not fit entirely in the SSD cache, a medium size (14 GB) fully-set-associative cache performs better than all of the direct-mapped counterparts (7, 14, and 28 GB), by giving an approximately 2.71 times, 2.16 times and 1.33 times higher performance, respectively. Generally, the fully-set-associative cache performs better due to higher hit ratio, shown in FIG. 7(b). This is because the fully-set-associative cache has significantly less conflict misses that the direct mapped counter-part, due to the spread-out mapping the latter exhibits. This benefit, however, diminishes as the cache size decreases, evident by the fact that for the smallest cache size (7 GB) the two associativities perform roughly equally. In this case, the 3.54% difference at hit ratio results in 3% better performance, because the significantly increased number of conflict misses has absorbed a large percentage of potential benefits from using an SSD cache. Furthermore, FIG. 7(c) shows that even a small decrease in HDD utilization results in significant performance benefits. For instance, the fully-set-associative medium size cache (14 GB) has 11.89% less HDD utilization than the small size (7 GB) counterpart, resulting in a 4.23 times better speedup. Generally, HDD utilization is reduced, as the percentage of workload that fits in the cache increases. SSD utilization remains under 7% in all configurations. Moreover, the native SSD run achieves a 38.81 times speedup, compared to HDDs.

Finally, TPC-H is very sensitive to the DRAM size. Performance is exponentially improved, as the percentage of the workload that fits in DRAM is increased. For instance, in case the whole workload fits in DRAM, the achieved speedup is 168.8 times. By combining all the above observations, we conclude that the choice of a proper DRAM size along with enough SSD space can lead to optimal performance gains for archival database benchmarks, such as TPC-H.

Figure 8:
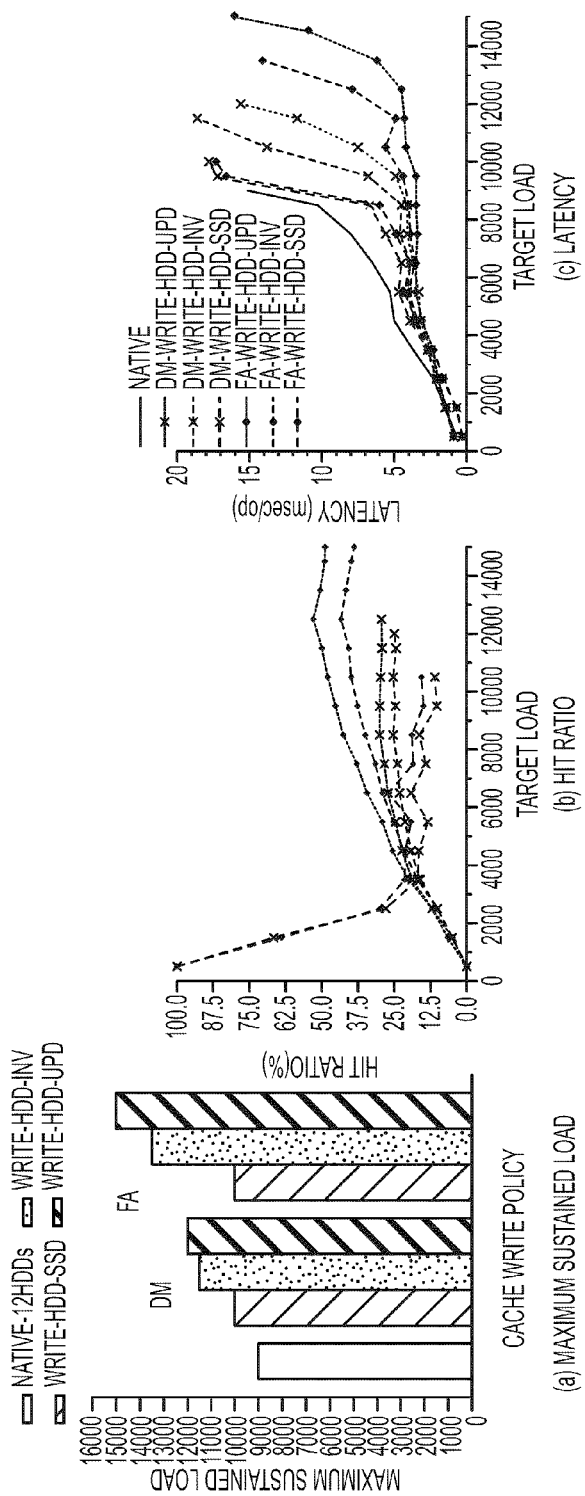
FIGS. 8(a)-(c) show the impact on associativity and write policy on SPECsfs2008 performance with a 128 GB cache size.

2) SPECsfs2008: For this workload we compare the performance of the invention with the native 12 HDD run, using 32 GB DRAM, and performing all experiments starting with a cold cache. We expect the choice of write policy to significantly affect performance, since this workload produces a fair amount of write requests. Furthermore, since SPECsfs2008 produces a very large number of small files during its execution, we expect the effect of the spread-out mapping the direct-mapped cache exhibits to be more evident in this workload. FIG. 8(a) presents the results using 128 GB of SSD cache. It is noted that depending on the write policy chosen, the increase in speed gained by the invention varies from 11% to 33% and from 10% to 63%, for the direct-mapped and fully-set-associative cache designs, respectively. The performance gains are directly dependent on the hit ratio, shown in FIG. 8(b), achieved by each write policy. The write-hdd-ssd write policy achieves the lowest hit ratio, hence the lowest performance improvement. This is because SPECsfs2008 produces a huge file-set but only access 30% of it. Thus, useful data blocks are evicted, overwritten by blocks that are never be read. Furthermore, because SPECsfs2008 exhibits a modify-read access pattern, the write-hdd-upd write policy exhibits better hit ratio than writehdd-inv, since the first will update the corresponding blocks present in the SSD cache, while the latter will essentially evict them.

Cache associativity also affects performance: the best write policy (write-hdd-upd) for the fully-set-associative cache performs 25% better than its direct-mapped counterpart, a result of the increased hit ratio. FIG. 8(c) shows that the response time per operation also improves with higher hit ratios: the better the hit ratio, the longer it takes for the storage system to get overwhelmed and, thus, it can satisfy greater target loads. Furthermore, CPU utilization (not shown) always remains below 25%, showing that the small random writes that SPECsfs2008 exhibits make HDDs the main performance bottleneck. HDD utilization is always 100%, while cache utilization remains below 25% for all configurations. Based on these observations, we conclude that even for write-intensive benchmarks, such as SPECsfs2008, that produce huge file sets the addition of SSDs as HDD caches in accordance with the invention holds great performance potential.

Figure 9:
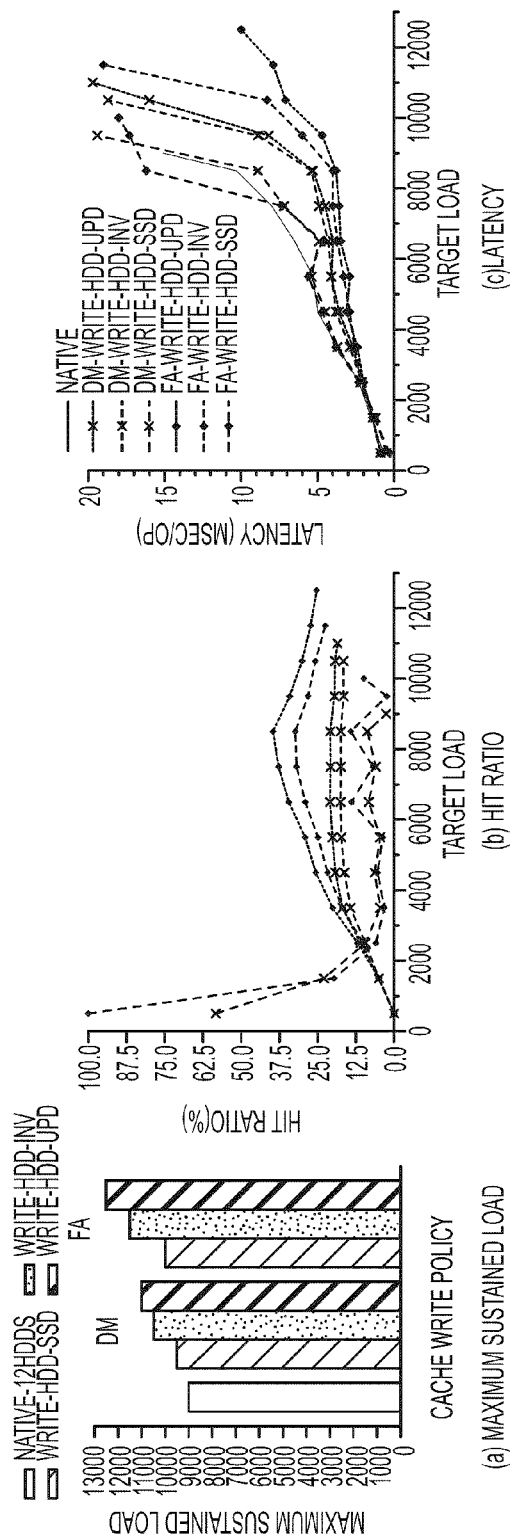
FIGS. 9(a)-(c) show the impact on associativity and write policy on SPECsfs2008 performance with a 64 GB cache size.

Finally, we examine how reducing the cache size affects performance. We run again our experiments, this time using 64 GB of SSD cache. We notice that, although the behavior of the write-policies remain the same (FIG. 9(a)), The system of the invention now becomes saturated earlier in the execution of the workload. This is due to the increased latencies (FIG. 9(c)) observed, and the fact that the hit ratio (FIG. 9(b)) starts to drop in earlier target loads. Still, there is a 22% and 38% performance improvement, compared to the native HDD run, for the direct-mapped and the fully-set-associative caches, respectively.

3) Impact of Cache Line Size on Performance: The I/O workloads generally exhibit poor spatial locality, hence cache lines larger than one block (4 KB) result in lower hit ratio. Thus, the benefits described above are not enough to amortize the impact on performance of this lost hit ratio, hence performance always degrades. However, since larger cache lines may eventually compensate the lost performance in the long term due to better interaction with the SSD's metadata management techniques in their flash translation layers (FTL).

Further Discussion

The DRAM space required by embodiments of the invention in each case are shown in Table II.

TABLE II

TRADING OFF DRAM SPACE FOR PERFORMANCE IN Azor.

|  | TPC-H | SPECsfs2008 | Hammerora |
|---|---|---|---|
| Base Cache Metadata Footprint | | 1.28 (DM)/6.03 (FSA) MB/GB of SSD | |
| Base Cache Max. Performance Gain | 14.02× | 63% | 55% |
| Additional Total Metadata for 2 LBS | 28 MB | No overhead | 56 MB |
| Max. Performance Gain with 2 LBS | 95% (DM) | 16% (DM) | 34% (FSA) |

The base cache design is the LRU-based fully-set associative cache. The 2LBS scheme offers additional gains to the base cache, and the best associativity in this case is shown in parenthesis. We see that, at the cost of consuming a considerable amount of DRAM in some cases, the invention provides significant performance improvement. Furthermore, the DRAM space required scales with the size of the SSD cache size, not with the capacity of the underlying HDDs. Thus, we expect the DRAM space requirements for metadata to remain moderate. However, if DRAM requirements are an issue for some systems, modifications to the invention can be made to trade DRAM space with performance, by using larger cache lines as earlier described.

Finally, the cost/benefit trade-off between DRAM size and SSD capacity, only affects workloads sensitive to DRAM, such as TPC-H. On the contrary, for workloads like TPC-C, additional DRAM has less impact as we observed in experiments not reported here. The experiments show that DRAM hit ratio remains below 4.7%, even if DRAM size is quadrupled to 16 GB. Similarly, for SPECsfs2008, additional DRAM serves only to improve the hit ratio for filesystem metadata.

The invention's 2LBS arrangement is feasible within disk controllers by embedding a metadata flag within the network storage protocol (e.g. SCSI) command packets transmitted from storage initiators to storage targets. Storage protocols have unused fields/commands that can carry this information. Then, it will be implemented in the storage controller (target in a networked environment) by using per-block access counters. The main issue in this case is standardization of storage protocols, and whether it makes sense to push hints from higher layers to lower. As shown, there is merit to such an approach.

Applying the invention to other filesystems requires modifying the filesystem implementation. We have modified XFS to mark metadata elements. However, transparent detection of metadata is needed is some setups, e.g. in virtual machines where the hypervisor cannot have access to block identity information. A mechanism has also been developed for automatically detecting filesystem metadata without any modifications to the filesystem itself, using the metadata magic numbers for this purpose. Preliminary results with the benchmarks used in this invention show that this mechanism adds low overheads to the common I/O path.

The invention makes extensive use of metadata to keep track of block placement. The system, like most traditional block-level systems, does not update metadata in the common I/O path, thus avoiding the necessary additional synchronous I/O. Accordingly there is no guarantee of metadata consistency after a failure: in this case the invention starts with a cold cache. This is possible because of the write-through policy ensuring that all data has its latest copy in the HDD. If the SSD cache has to survive failures, this would require trading-off higher performance with consistency to execute the required synchronous I/O in the common path.

However, it is preferably to choose to optimize the common path at the expense of starting with a cold cache after a failure.

Given that SSD controllers currently do not expose any block state information, we rely on the flash translation layer (FTL) implementation within the SSD for wear-leveling. Designing block-level drivers and file-systems in a manner cooperative to SSD FTLs which improves wear-leveling and reduces FTL overhead is an important direction, especially while raw access to SSDs is not provided by vendors to system software.

Various modifications to the invention are contemplated without departing from the spirit and scope of the invention which is defined in the claims that follow. While various steps and computer components have been herein used, these are to be given their ordinary definition as would be known in the art, unless explicitly limited or otherwise herein defined. The above-described embodiments are intended to be examples of the present invention and alterations and modifications may be effected thereto, by those of skill in the art, without departing from the scope of the invention that is defined solely by the claims appended hereto.

What is claimed is:

1. A method for carrying out a cache write operation of data blocks stored on a first storage device and cached onto a second storage device, the method comprising:
    mapping data blocks stored on a first storage device onto data blocks stored on a second storage device;
    intercepting a request for a cache write operation to write a data block stored on the first storage device to the second storage device;
    upon determining that the data block contains filesystem metadata, writing the data block to the second storage device;
    upon determining that the data block does not contain filesystem metadata:
        aborting the cache write operation upon determining that the-correspondingly mapped data block contains filesystem metadata; and
    upon further determining that the correspondingly mapped data block does not contain filesystem metadata, performing any one of:
        aborting the cache write operation upon determining that the correspondingly mapped data block contains data that is more frequently accessed than data contained in the data block, and
        completing the cache write operation upon determining that the correspondingly mapped data block contains data that is less frequently accessed than data contained in the data block.

2. A method according to claim 1, wherein the first storage device is a hard disk drive.

3. A method according to claim 2, wherein the second storage device is a solid state drive.

4. A method according to claim 1, wherein intercepting is carried out in an input/output path between the first storage device and a filesystem accessing the first storage device.

5. A method according to claim 4, wherein intercepting is carried out by an admission control module implemented as a virtual block layer between the filesystem and the first storage device.

6. A method for caching a data block stored on a first storage device to a second storage device; the method comprising:
    mapping blocks stored on a first storage device onto blocks of a second storage device;
    intercepting a request for a cache write operation to write a data block stored on the first storage device to the second storage device;
    upon determining that the data block contains a first type of data, completing the cache write operation; and
    upon determining that the data block does not contain the first type of data performing any one of:
        aborting the cache write operation upon determining that the correspondingly mapped block contains the first type of data, and
        completing the cache write operation upon determining that the correspondingly mapped block does not contain the first type of data.

7. A method according to claim 6, further comprising:
    upon determining that the correspondingly mapped block contains a second type of data, performing any one of:
        aborting the cache write operation upon determining that the correspondingly mapped block contains the second type of data, and
        completing the cache write operation upon determining that the correspondingly mapped block does not contain the second type of data.

8. A method according to claim 6, wherein the first type of data is filesystem metadata.

9. A method according to claim 7, wherein the second type of data is data that is more frequently accessed than data on the data block.

10. A method according to claim 6, wherein the first storage device is a hard disk drive.

11. A method according to claim 7, wherein the second storage device is a solid state drive.

12. A method according to claim 6, wherein intercepting is carried out in an input/output path between the first storage device and a filesystem accessing the first storage device.

13. A method according to claim 12, wherein the intercepting is carried out by an admission control module implemented as a virtual block layer between the filesystem and the first storage device.

14. A method according to claim 6, wherein determining comprises reading stored values indicative of the first type of data from the filesystem or from a repository of stored values.

15. A non-transitory computer readable medium having computer readable instructions thereon to carry out the method of claim 6.

16. A computer system comprising
    a filesystem in communication with a first storage device via an input/output path;
    an admission control module in the input/output path;
    a second storage device in communication with the admission control module,
        wherein the admission control module includes instructions for:
        mapping blocks stored on a first storage device onto blocks of the second storage device;
        intercepting a request for a cache write operation to write a data block stored on the first storage device to the second storage device;
        upon determining that the data block contains a first type of data, completing the cache write operation; and
        upon determining that the data block does not contain the first type of data performing any one of:
            aborting the cache write operation upon determining that the correspondingly mapped block contains the first type of data, and completing the cache write operation upon determining that the correspondingly mapped block does not contain the first type of data.

17. A computer system according to claim 16, wherein the admission control module further includes instructions for:
upon determining that the correspondingly mapped block contains a second type of data, performing any one of:
aborting the cache write operation upon determining that the correspondingly mapped block contains the second type of data, and
completing the cache write operation upon determining that the correspondingly mapped block does not contain the second type of data.

18. A computer system according to claim 16, wherein the first type of data is filesystem metadata.

19. A computer system according to claim 14, wherein the second type of data is data that is more frequently accessed than data on the data block.

20. A computer system according to claim 16, wherein the first storage device is a hard disk drive.

21. A computer system according to claim 16, wherein the second storage device is a solid state drive.

\* \* \* \* \*